United States Patent
Hwang et al.

(10) Patent No.: US 8,963,014 B2
(45) Date of Patent: Feb. 24, 2015

(54) TOUCH PANEL AND DISPLAY DEVICE INCLUDING THE SAME

(71) Applicant: LG Chem, Ltd., Seoul (KR)

(72) Inventors: Ji Young Hwang, Daejeon (KR); In-Seok Hwang, Daejeon (KR); Seung Heon Lee, Daejeon (KR); Yong Goo Son, Daejeon (KR); Beom Mo Koo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/973,602

(22) Filed: Aug. 22, 2013

(65) Prior Publication Data

US 2013/0342504 A1 Dec. 26, 2013

Related U.S. Application Data

(63) Continuation of application No. PCT/KR2012/011399, filed on Dec. 24, 2012.

(51) Int. Cl.
*H05K 1/09* (2006.01)
*G06F 3/041* (2006.01)
*G06F 3/044* (2006.01)

(52) U.S. Cl.
CPC ............ *G06F 3/041* (2013.01); *G06F 3/044* (2013.01); *G06F 2203/04103* (2013.01)
USPC .......................................... 174/257; 174/261

(58) Field of Classification Search
CPC .......... H01L 2924/01079; H01L 2924/01078; H01L 2924/3011; H05K 1/111; H05K 1/112; H05K 1/092; H05K 1/095; H05K 1/0306; H05K 3/3452; H05K 3/244; H05K 3/0052; H05K 2201/09781; G06F 3/0488; G06F 3/04883; G06F 3/044; G06F 3/04886; G06F 3/045

USPC ........... 174/250, 253, 257, 261; 345/173, 174
See application file for complete search history.

(56) References Cited

U.S. PATENT DOCUMENTS

| | | | | |
|---|---|---|---|---|
| 2003/0234770 | A1* | 12/2003 | MacKey | 345/173 |
| 2008/0264699 | A1* | 10/2008 | Chang et al. | 178/18.01 |
| 2011/0096005 | A1* | 4/2011 | Kim et al. | 345/173 |
| 2011/0181545 | A1 | 7/2011 | Takahashi et al. | |
| 2011/0236597 | A1 | 9/2011 | Chan | |
| 2011/0256307 | A1* | 10/2011 | Kim et al. | 427/79 |
| 2011/0304578 | A1* | 12/2011 | Kim et al. | 345/174 |
| 2012/0001863 | A1* | 1/2012 | Kim et al. | 345/174 |
| 2012/0031746 | A1 | 2/2012 | Hwang et al. | |
| 2013/0027348 | A1* | 1/2013 | Oh et al. | 345/174 |

FOREIGN PATENT DOCUMENTS

| | | |
|---|---|---|
| JP | 2011-154442 | 8/2011 |
| KR | 2010-0090669 | 8/2010 |
| KR | 2010-0114691 | 10/2010 |
| KR | 2011-0099607 | 9/2011 |
| KR | 2011-0109119 | 10/2011 |
| KR | 2011-0136310 | 12/2011 |

* cited by examiner

*Primary Examiner* — Hoa C Nguyen
(74) *Attorney, Agent, or Firm* — McKenna Long & Adridge, LLP (57) ABSTRACT

The present invention relates to a touch panel, comprising: a screen part comprising a first conductive pattern portion, and a router part comprising a second conductive pattern portion, in which the first conductive pattern portion and the second conductive pattern portion have the same line height, and there is no connecting portion in a region in which the first conductive pattern portion and the second conductive pattern portion are connected to each other, and a display apparatus comprising the same.

14 Claims, 5 Drawing Sheets

Figure 1

<Microphotograph of Cliche>

<Microphotograph of Conductive Pattern>

TOUCH PANEL AND DISPLAY DEVICE INCLUDING THE SAME

This application is a Continuation Bypass of International Application No. PCT/KR2012/011399, filed Dec. 24, 2012 and, claims priority to and the benefit of Korean Patent Application No. 10-2011-0141743, filed on Dec. 23, 2011, the disclosures of which are incorporated herein by reference in their entirety.

TECHNICAL FIELD

The present invention relates to a touch panel and a display apparatus comprising the same.

BACKGROUND ART

Recently, as distribution of smart phones, and tablet PCs, IPTVs, and the like has accelerated, requirement for a touch function in which a hand of human directly becomes an input device without a separate input device such as a keyboard or a remote controller has gradually increased. Further, a writable multi-touch function has been additionally required in addition to a specific point touch function.

The touch panel having the functions may be classified as follows according to a signal detecting method.

That is, the touch panels are divided into a resistive type detecting a position pressed by pressure through a change in a current or voltage value in a state where DC voltage is applied, a capacitive type using capacitance coupling in a state where AC voltage is applied, and an electromagnetic type detecting a selected position as a change in voltage in a state where a magnetic field is applied.

Among the types, the resistive type and capacitive type touch panels, which are the most commonly used, recognize a touch or not according to an electrical touch or a change of capacitance by using a transparent conductive film such as an ITO film. However, the transparent conductive film almost has high resistance of 150 ohm/square or more, and sensitivity when increasing a size deteriorates. In addition, as a size of a screen is increased, costs of the ITO film rapidly increase, and as a result, commercialization is not easy. In order to solve the problem, an attempt to implement a large size by using a metal pattern having high conductivity has been performed.

When the touch panel is formed by the metal pattern, a minute pattern is provided on a screen part, while a conductive pattern needs to be provided in a relatively wide region of a pad part for connection with a power source. Accordingly, in the case of using a photolithography method in order to form the screen part and the pad part at once, a lot of costs are consumed, and in the case of using a printing method, a pattern having a desired shape is not formed due to a touch of a printing roll on the bottom. In order to overcome the problem, a method of forming the screen part and the pad part by different processes has been attempted, but there is a problem in that the processes are complicated and a lot of costs are consumed.

DETAILED DESCRIPTION OF THE INVENTION

Technical Problem

In order to solve the aforementioned problems in the related art, the present invention is directed to a method of simply manufacturing a screen part and a pad part of a touch panel at a low price, after conducting a lot of researches.

Technical Solution

An exemplary embodiment of the present invention provides a touch panel comprising: a screen part comprising a first conductive pattern portion; and a router part comprising a second conductive pattern portion, in which the first conductive pattern portion and the second conductive pattern portion have the same line height, and there is no connecting portion in a region where the first conductive pattern portion and the second conductive pattern portion are connected with each other.

Another exemplary embodiment of the present invention provides a display apparatus comprising the touch panel.

Advantageous Effects

In the present invention, a conductive pattern corresponding to a screen part and a conductive pattern corresponding to a router part are formed by one process and thus the conductive patterns having the same line height and having no connecting portion may be formed on one transparent substrate. As a result, the touch panel may be provided at low costs by a simple process.

BEST MODE

Hereinafter, the present invention will be described in more detail.

A touch panel according to the present invention comprises a screen part comprising a first conductive pattern portion, and a router part comprising a second conductive pattern portion, in which the first conductive pattern portion and the second conductive pattern portion have the same line height, and have no connecting portion in a region in which the first conductive pattern portion and the second conductive pattern portion are connected to each other.

Hereinafter, although the description relating to the conductive pattern or the conductive substrate is not divided into the description relating to a touch panel comprising one conductive substrate where conductive patterns are provided on one side or both sides of a transparent substrate and the description relating to a touch panel comprising two conductive substrates each of which comprises a transparent substrate and a conductive pattern and which are laminated, the description relating to the conductive pattern or the conductive substrate may be applied to all exemplary embodiments of the touch panel according to the present invention unless otherwise noted.

In the present invention, the fact that there is no connecting portion means that there is no artificially connected trace in the physically connected conductive pattern. Generally, since due to different pattern shapes and scales of the screen part and the router part, in the related art, the screen part and the router part were formed by different methods, the connecting portion was inevitably formed at a portion where the patterns are connected to each other. However, in the present invention, since the screen part and the pad part may be formed by using one process, the screen part and the pad part have no connecting portion and the same line height.

In the present invention, the same line height means that a standard deviation of the line heights is less than 10%, preferably less than 5%, or more preferably less than 2%.

In the present invention, the screen part comprises a first conductive pattern portion, and the router part comprises a second conductive pattern portion, in which the first conductive pattern portion and the second conductive pattern portion have the same line height, and the first conductive pattern portion and the second conductive pattern portion are electrically connected to each other without a connecting portion.

In the present invention, a linear resistance value on the shortest distance from any one side contacting the second conductive pattern portion to the other side facing the one side in any one electrically connected region of the first conductive pattern portion may be equal to or larger than a linear resistance value from any one side contacting the first conductive pattern portion to the other side where the second conductive pattern portion contacts a terminal part of the router part, in any one electrically connected region of the second conductive pattern portion. According to the linear resistance value, a line width of the first conductive pattern portion that corresponds to the linear resistance value on the shortest distance from any one side contacting the second conductive pattern portion to the other side facing the one side in any one electrically connected region of the first conductive pattern portion may be smaller than a line width of second conductive pattern portion that corresponds to the linear resistance value from any one side contacting the first conductive pattern portion to the other side where the second conductive pattern portion contacts the terminal part of the router part in any one electrically connected region of the second conductive pattern portion. Further, as a result, an electric flow characteristic between the first conductive pattern portion and the second conductive pattern portion may be further improved.

At least a part of the second conductive pattern portion has a line width different from that of the first conductive pattern portion. In more detail, a line width of at least a part of the first conductive pattern portion may be smaller than a line width of the second conductive pattern portion. For example, a difference in a line width between at least a part of the second conductive pattern portion and the first conductive pattern portion may be 5 micrometers or more, 15 micrometers or more, 30 micrometers or more, and 100 micrometers or less.

In the touch panel according to the present invention, the first conductive pattern portion and the second conductive pattern portion may be manufactured by a printing method. As a detailed example, the conductive patterns may be formed on a transparent substrate by a reverse offset printing method or a gravure printing method. In addition, after an etching resist is formed on a substrate with a conductive layer by a reverse offset printing method or a gravure offset printing method, the conductive patterns may be formed by etching the conductive layer by using the formed etching resist. In the present invention, for pattern precision, the reverse offset printing method is more preferable.

According to an exemplary embodiment of the present invention, a width and a depth of a pattern of a cliche used in the printing method may be controlled in order to form the first conductive pattern portion and the second conductive pattern portion having the same line height and having no connecting portion as described above while comprising two kinds or more of conductive patterns having different line widths. According to an exemplary embodiment, the conductive patterns may be formed by one process by controlling a relationship between the width and the depth of the pattern in the cliche having the same depth of the pattern. According to another exemplary embodiment, a cliche comprising two or more regions having different depths of the pattern may be used, and in this case, the conductive patterns may be formed by one process by using a cliche having an appropriate depth of a pattern according to a width of a desired pattern. The cliche may be acquired by double etching.

As one example, in the present invention, as a cliche comprising a grooved pattern, the cliche featuring that the grooved pattern comprises a region constituted by linear patterns which do not cross each other, and the region constituted by the linear patterns, as a square region comprising two or more lines of the linear pattern in the region, comprises a region where a line width W and a depth D of the linear pattern, a ratio R of a region without the linear patterns in the square region, and an opening line width $W_0$ of a mask pattern for forming a pattern corresponding to the linear pattern satisfy the following Formulas 1 and 2 may be used.

$$W=2D+W_0+X \qquad \text{[Formula 1]}$$

$$D \geq 42.9\exp(-R/0.35)-1.5 \qquad \text{[Formula 2]}$$

Here, X is a constant,

D, W, $W_0$, and X are values having a micrometer unit, and R is a value of more than 0 to less than 1.

In this case, in the square region, the line width W and a pitch P of the linear pattern, and the ratio R of the region without the linear patterns in the square region may additionally satisfy the following Formula 3.

$$R=P(P-W)/P^2=(P-W)/P \qquad \text{[Formula 3]}$$

Here, W, P, and X are values having a micrometer unit, and R is a value of more than 0 to less than 1.

The linear pattern may be a regular or irregular pattern, and the linear pattern may comprise a straight line, a curved line, a zigzag line, or a combination thereof.

In the cliche, the region satisfying Formulas 1 and 2 may be 50% or more of the entire grooved pattern region.

In the case where the cliche comprises two or more different patterns, the two or more patterns have the same depth D, and the depth D may satisfy Formulas 1 and 2 based on a pattern having the smallest ratio R of the region without the linear patterns.

In the case where the cliche comprises two or more different patterns, the two or more patterns comprise two or more regions having different depths D, and the two or more regions having different depths D of the pattern may satisfy Formulas 1 and 2, respectively. The cliche may be manufactured by double etching.

As another example, in the present invention, as a cliche comprising a grooved pattern, the cliche featuring that the grooved pattern comprises a region constituted by a mesh pattern, and the region constituted by the mesh pattern, as a square region comprising three or more cross points of lines configuring the mesh pattern in the region, comprises a region where a line width W and a depth D of the mesh pattern, a ratio R of a region without the mesh pattern in the square region, and an opening line width $W_0$ of a mask pattern for forming a pattern corresponding to the mesh pattern satisfy the following Formulas 1 and 4 may be used.

$$W=2D+W_0+X \quad \text{[Formula 1]}$$

$$D \geq 33.8\exp(-R/0.235)+0.82 \quad \text{[Formula 4]}$$

Here, X is a constant,
D, W, $W_0$, and X are values having a micrometer unit, and R is a value of more than 0 to less than 1.

In the square region, the line width W and a pitch P of the mesh pattern, and the ratio R of the region without the mesh pattern in the square region may additionally satisfy the following Formula 5.

$$R=(P-W)^2/P^2=(1-W/P)^2 \quad \text{[Formula 5]}$$

Here, W, P, and X are values having a micrometer unit, and R is a value of more than 0 to less than 1.

The mesh pattern may be a regular or irregular pattern, and the region satisfying the Formulas 1 and 4 may be 50% or more of the entire grooved pattern region.

The grooved pattern comprises two or more different patterns in the square region, the two or more patterns have the same depth D, and the depth D may satisfy Formulas 1 and 4 based on a pattern having the smallest ratio R of the region without the linear pattern.

In the case where the cliche comprises two or more different patterns, the two or more patterns comprise two or more regions having different depths D, and the two or more regions having different depths D of the pattern may satisfy Formulas 1 and 4, respectively. The cliche may be manufactured by double etching.

As another example, in the present invention, as a cliche comprising a grooved pattern, the cliche featuring that the grooved pattern comprises a region constituted by a mesh pattern and a segmented pattern of the mesh pattern, and the region, as a square region comprising three or more cross points of lines configuring the mesh pattern in the region, comprises a region where a line width W and a depth D of the mesh pattern, a ratio R of a region without the mesh pattern and the segmented pattern of the mesh pattern in the square region, and an opening line width $W_0$ of a mask pattern for forming a pattern corresponding to the mesh pattern and the segmented pattern of the mesh pattern satisfy the following Formulas 1 and 4 may be used.

$$W=2D+W_0+X \quad \text{[Formula 1]}$$

$$D \geq 33.8\exp(-R/0.235)+0.82 \quad \text{[Formula 4]}$$

Here, X is a constant,
D, W, $W_0$, and X are values having a micrometer unit, and R is a value of more than 0 to less than 1.

Here, the segmented pattern of the mesh pattern means a pattern where the mesh pattern is modified by disconnection.

In the square region, the line width W and a pitch P of the mesh pattern and the segmented pattern of the mesh pattern, and the ratio R of the region without the mesh pattern and the segmented pattern of the mesh pattern in the square region may additionally satisfy the following Formula 5.

$$R=(P-W)^2/P^2=(1-W/P)^2 \quad \text{[Formula 5]}$$

Here, W, P, and X are values having a micrometer unit, and R is a value of more than 0 to less than 1.

In the cliche, the region satisfying Formulas 1 and 4 may be 50% or more of the entire grooved pattern region.

The grooved pattern of the cliche may comprise linear patterns which do not cross each other, a mesh pattern, or both the linear patterns and the mesh pattern.

According to an exemplary embodiment of the present invention, two kinds or more of patterns of which a difference in a line width is 5 micrometers or more, 8 micrometers or more, 15 micrometers or more, or 30 micrometers or more may be comprised. In the present invention, the two kinds or more of patterns having different line widths may be formed at the same line height by one process without a connecting portion.

According to another exemplary embodiment of the present invention, a difference in a line width between the first conductive pattern portion and the second conductive pattern portion may be 100 micrometers or less. As such, even in the case where the cliche having the same depth of the patterns by controlling the difference in the line width is used, two or more kinds of patterns having different line widths may be formed at the same line height by one process without a connecting portion.

In the touch panel according to the present invention, the first conductive pattern may comprise a conductive line having a line width of 20 micrometers or less, and may comprise a conductive line having a line width of 15 micrometers or less, 10 micrometers or less, 7 micrometers or less, 4 micrometers or less, or 3 micrometers or less. In the present invention, the line width of the conductive line may be controlled in the range of 0.5 to 10 micrometers. An aperture ratio of the third conductive pattern, that is, an area ratio of the transparent substrate which is not covered by the pattern is preferably 70% or more, and may be 90% or more, 93% or more, 95% or more, 96% or more, 97% or more, 98% or more, or 99% or more.

In the present invention, a line height of the first conductive pattern may be 0.01 micrometer to 1 micrometer, 1 micrometer to 2 micrometers, 2 micrometers to 5 micrometers, 5 micrometers to 10 micrometers, or 10 micrometers or more, and those skilled in the art may select the line height according to a use, a process, or a material.

In the present invention, a region of the first conductive pattern portion which is connected with the second conductive pattern portion may be formed to have the same line width as the second conductive pattern portion. As a result, an electrical connection of the first conductive pattern portion and the second conductive pattern portion may be more stably performed. Further, the first conductive pattern portion and the second conductive pattern portion may be connected with each other by a single line, but may be connected with each other by two or more lines. In the case of connecting the first conductive pattern portion and the second conductive pattern portion by using by two or more lines, a ratio at which a defect is generated due to an error of a pattern transfer or a pattern disconnection may be decreased. Further, in order to further improve connection between the region connecting the first conductive pattern portion and the second conductive pattern portion and the first conductive pattern portion, in the case where the first conductive pattern portion is a regular pattern such as a mesh pattern, particularly, in any one electrically connected region of the first conductive pattern portion, it is preferred that a flow direction of electricity of the first conductive pattern portion from any one side of the screen part to the other side facing the one side is arranged not to be the same as a progress direction of each line component of the mesh pattern which is the conductive line of the first conductive pattern portion because the number density of contacting lines is increased in the connection density of lines between the region of connecting the first conductive pattern portion and the second conductive pattern portion and the mesh pattern line of the first conductive pattern portion, as compared with a case where the flow direction of electricity and the direction of a line component of the mesh pattern coincides to each other.

Figure 1:
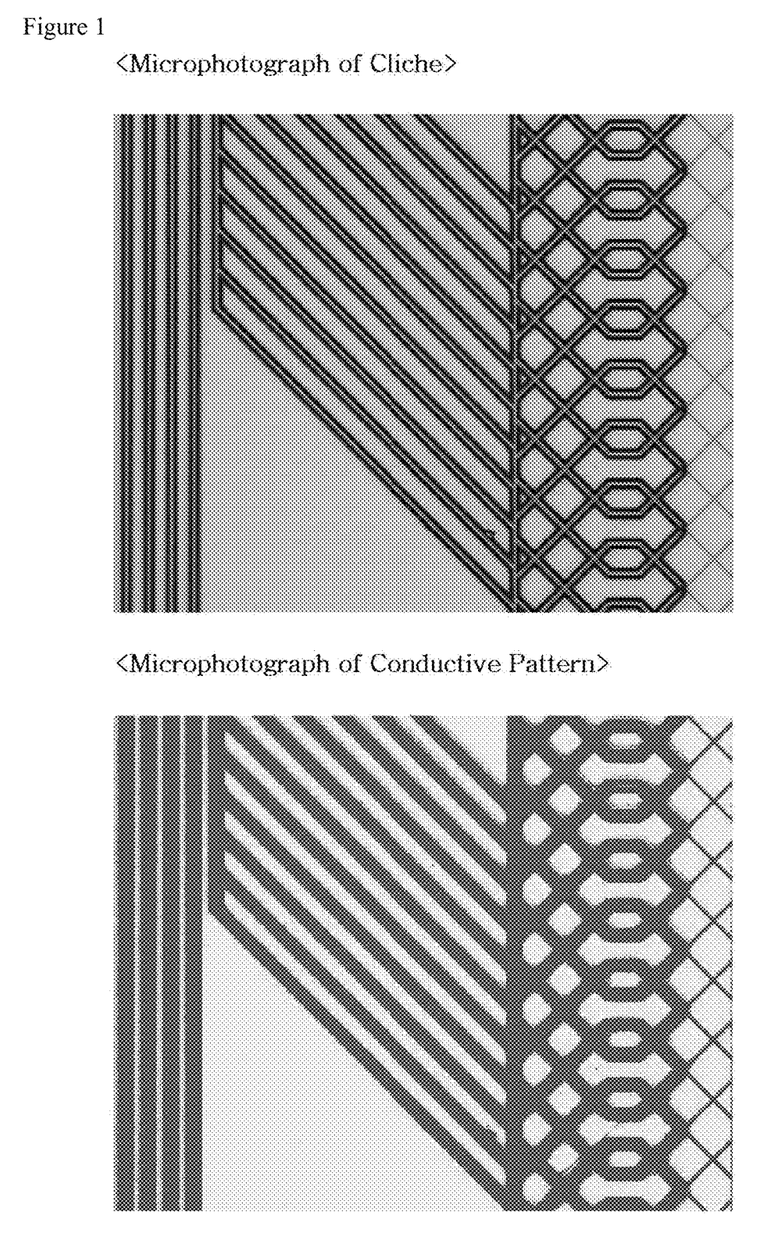
FIG. 1 illustrates an example of a conductive pattern comprised in a touch panel according to an exemplary embodiment of the present invention.
Figure 5:
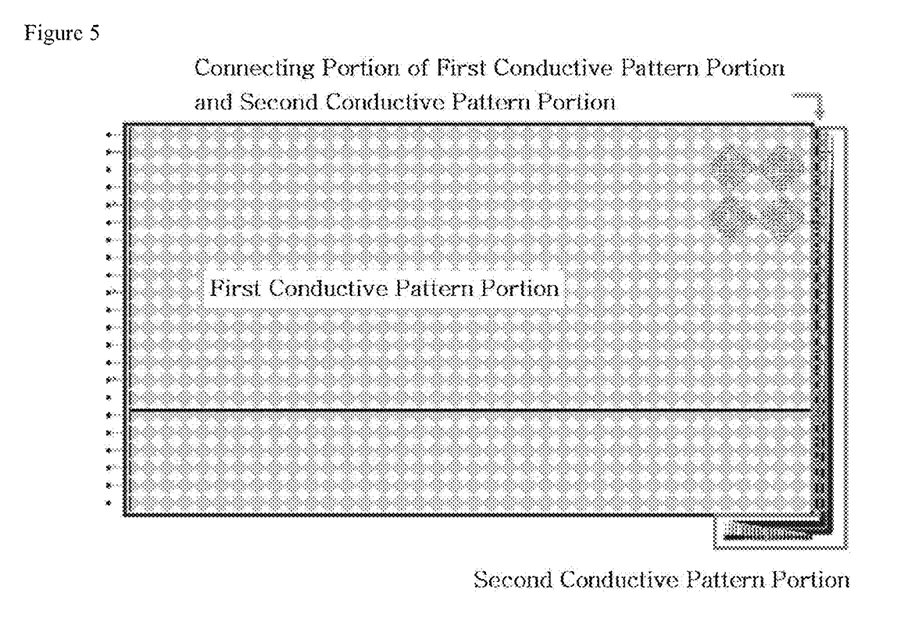
FIG. 5 illustrates an example of a conductive pattern comprised in a touch panel according to an exemplary embodiment of the present invention.

FIGS. 1 and 5 illustrate conductive patterns according to the exemplary embodiment of the present invention.

In the present invention, the first conductive pattern portion and the second conductive pattern portion may be constituted by straight lines, but may be variously modified to be constituted by curve lines, wave lines, zigzag lines, and the like. Further, the first conductive pattern portion and the second conductive pattern portion may have a mixed shape of at least two kinds of lines of the shapes.

In the present invention, the first conductive pattern portion and the second conductive pattern portion may comprise polygonal patterns of three angles or more, for example, a triangle, a quadrangle, a pentagon, a hexagon, or a heptagon or more.

In the present invention, the first conductive pattern portion and the second conductive pattern portion may comprise regular patterns. Here, the regular pattern means that the shape of the pattern has regularity. For example, the conductive pattern may comprise a pattern having a mesh shape such as a rectangle or a square or a hexagon shape.

In the present invention, the first conductive pattern portion and the second conductive pattern portion may comprise irregular patterns. Here, the irregular pattern means that the shape of the pattern does not have regularity. Particularly, the third conductive pattern portion may comprise at least partially an irregular pattern in order to prevent a moire phenomenon.

In the touch panel according to the present invention, the first conductive pattern is the regular pattern and comprises cross points formed by crossing any plurality of lines among lines configuring the conductive pattern. In this case, the number of cross points may be 3,000 to 122, 500, 13,611 to 30,625, and 19,600 to 30,625 in an area of 3.5 cm×3.5 cm. Further, according to an exemplary embodiment of the present invention, in the case where the number of cross points is 4,000 to 123,000 when the touch panel is mounted on the display, it was verified that the touch panel has a light characteristic without largely damaging an optical characteristic of the display.

Further, in the touch panel according to the present invention, the first conductive pattern is the irregular pattern and comprises cross points formed by crossing any plurality of lines among lines configuring the conductive pattern. In this case, the number of cross points may be 6,000 to 245,000, 3,000 to 122,500, 13,611 to 30,625, and 19,600 to 30,625 in an area of 3.5 cm×3.5 cm. Further, according to an exemplary embodiment of the present invention, in the case where the number of cross points is 4,000 to 123,000 when the touch panel is mounted on the display, it was verified that the touch panel has a light characteristic without largely damaging an optical characteristic of the display.

The pitch of the first conductive pattern may be 600 μm or less and 250 μm or less, but may be controlled according to transmittance and conductivity desired by those skilled in the art.

The first conductive pattern used in the present invention is made of preferably a material having specific resistance of $1 \times 10^6$ ohm·cm to $30 \times 10^6$ ohm·cm, and more preferably $7 \times 10^6$ ohm·cm or less.

In the present invention, the first conductive pattern may be an irregular pattern.

The irregular pattern comprises an edge structure of closed figures which are continuously connected to each other, the closed figures having the same shape do not exist within any irregular unit area of 1 cm×1 cm, and the number of vertexes of the closed figures may be different from the number of vertexes of quadrangles having the same number as the closed figures. In more detail, the number of vertexes of the closed figures may be larger than the number of vertexes of quadrangles having the same number as the closed figures and may be 1.9 to 2.1 times larger than the number of vertexes of quadrangles, but is not limited thereto.

The closed figures are continuously connected to each other, and for example, in the case where the closed figures are polygons, the adjacent closed figures may share at least one side.

The irregular pattern comprises an edge structure of closed figures which are continuously connected to each other, the closed figures having the same shape do not exist within any unit area of 1 cm×1 cm of the irregular pattern, and the number of vertexes of the closed figures may be different from the number of vertexes of polygons formed by connecting the shortest distances between centers of gravity of the respective closed figures. In more detail, the number of vertexes of the closed figures may be larger than the number of vertexes of polygons formed by connecting the shortest distances between the centers of gravity of the respective closed figures and may be 1.9 to 2.1 times larger than the number of vertexes of polygons, but is not limited thereto.

The irregular pattern comprises an edge structure of closed figures which are continuously connected to each other, the closed figures having the same shape do not exist within any unit area of 1 cm×1 cm of the irregular pattern, and the closed figures may have a value of 50 or more acquired by the following Equation 1.

$$\text{(Standard deviation of distance between vertexes/Average of distance between vertexes)} \times 100 \quad \text{[Equation 1]}$$

The value of Equation 1 may be calculated within a unit area of the conductive pattern. The unit area may be an area formed by the conductive pattern, for example, 3.5 cm×3.5 cm and the like, but is not limited thereto.

In the present invention, the vertex is defined to mean points in which lines configuring edges of the closed figures of the conductive pattern cross each other.

The irregular pattern may have an edge structure shape of closed figures formed when respective points are connected to the closest points as compared with distances from other points, after any points are disposed in a unit cell which is regularly arranged.

In this case, when irregularity is introduced to a method in which any points are disposed in the regularly arranged unit cell, the irregular pattern may be formed. For example, in the case where the irregularity is 0, when the unit cell is a square, the conductive pattern has a square mesh structure, and when the unit cell is a regular hexagon, the conductive pattern has a honeycomb structure. That is, the irregular pattern means a pattern in which the irregularity is not 0.

By the conductive pattern having the irregular pattern shape according to the present invention, it is possible to suppress concentration of lines configuring the pattern, acquire uniform transmittance from a display and equally maintain linear density for a unit area, and secure uniform conductivity.

According to one preferable exemplary embodiment of the present invention, the second conductive pattern portion is preferably a stripe pattern, and the first conductive pattern portion may comprise the regular pattern, the irregular pattern, or a combination pattern thereof.

When the conductive pattern is prepared, after the pattern is designed in a limited area, a large-area pattern may also be prepared by using a method of connecting the limited areas repetitively. In order to repetitively connect the patterns, the repetitive patterns may be connected with each other by fixing the positions of the dots of each side. In this case, the limited area is preferably an area of 1 cm² or more and more preferably an area of 5 cm² or more in order to prevent a moire phenomenon due to the regularity, but may be selected by those skilled in the art according to a desired area of the conductive pattern.

In order to prepare the conductive pattern, first, after determining a desired pattern shape, a precise conductive pattern having a thin line width may be formed on the transparent substrate by using a printing method.

The printing method may be performed by transferring and firing a paste comprising a conductive pattern material on the transparent substrate in a desired pattern shape. The transfer method is not particularly limited, but the desired pattern may be transferred on the transparent substrate by forming the pattern shape on a pattern transfer medium such as an intaglio or a screen and using the formed pattern shape. A method of forming the pattern shape on the pattern transfer medium may use a known method in the art.

The printing method is not particularly limited and may use a printing method such as offset printing, screen printing, gravure printing, flexo printing, and inkjet printing, and may use a complex method of one kind or more thereof. The printing method may use a roll to roll method, a roll to plate method, a plate to roll method, or a plate to plate method.

Figure 2:
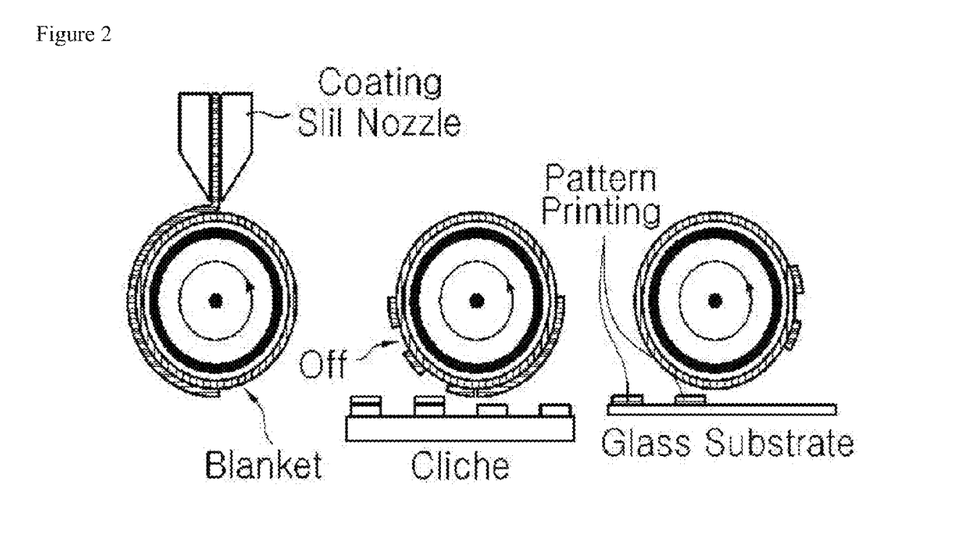
FIGS. 2 and 3 illustrate a process of forming a conductive pattern of the touch panel according to the exemplary embodiment of the present invention.

In the present invention, in order to implement the precise conductive pattern, it is preferable to apply the reverse offset printing method. FIG. 2 illustrates a direct and indirect printing process and a direct printing process using a reverse offset printing method. Referring to FIG. 2, when etching is performed on a silicon-based rubber called a blanket, a method of forming a desired pattern may be performed by coating ink capable of serving as a resist throughout an area, primarily removing an unnecessary portion through an intaglio having a pattern which is called a cliche, and secondarily transferring a print pattern remaining on the blanket to a film where metal and the like are deposited or a substrate such as glass, and then firing and etching the transferred print pattern. In the case of using the method, as uniformity of a line height in the entire area is secured by using the substrate deposited with the metal, it is advantageous that resistance in a thickness direction may be uniformly maintained.

Figure 3:
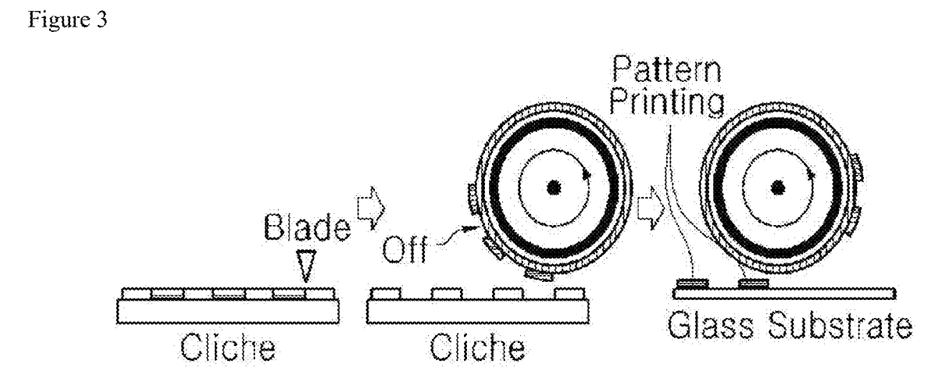

Another example to which the present invention may be applied uses a gravure offset method as illustrated in FIG. 3. The gravure offset printing may be performed by filling a paste in the intaglio having the pattern, primarily transferring the paste to the blanket, and then, secondarily transferring the paste by contacting the blanket and the transparent substrate. In addition, the gravure printing may be performed by a modified method of winding a blanket having the pattern on a roll, filling a paste in the pattern, and then transferring the paste to the transparent substrate. In the present invention, the methods may be complexly used, in addition to the methods.

According to an exemplary embodiment of the present invention, the first conductive pattern portion and the second conductive pattern portion may be blackened. As a result, even in the case where the conductive pattern is made of a metallic material, visibility may be further reduced. In the case of forming a pattern by directly printing a conductive material, in order to blacken the conductive pattern, a blackening is performed after adding a blackening material to a paste or ink for forming the conductive pattern, or printing and firing the paste or ink to blacken the conductive pattern.

The blackening material which may be added to the ink or the paste comprises metal oxide, carbon black, carbon nanotube, black pigment, colored glass flit, and the like. The blackening after firing may be performed by immersing in an oxidation solution, for example, a solution containing Fe or Cu ion, immersing in a solution containing halogen ion such as chlorine ion, immersing in peroxide, nitrate, and the like, and a treatment by halogen gas, or the like, in the case where the ink or the paste is an Ag based material.

In the case of a method of forming the pattern through etching, not a method of directly printing a metallic material, another example of the blackening may use a method of depositing a blackening layer on a surface viewed by a person, depositing a layer for providing conductivity thereon, and patterning the layers at once during a post etching process. As an example, in the case of depositing the blackening layer through MoOxNy, depositing an Al layer thereon, and printing and etching resist ink on the substrate, MoOxNy and Al are simultaneously patterned in an etchant such as a mixed solution of phosphoric acid, nitric acid, acetic acid, and water and thus a desired surface is blackened.

In the present invention, the first conductive pattern portion and the second conductive pattern portion may be formed on a transparent substrate. The transparent substrate is not particularly limited, but light transmittance thereof is 50% or more, preferably 75% or more, and more preferably 88% or more. In detail, the transparent substrate may use glass, a plastic substrate, or a plastic film. The plastic substrate or film may use a material which is known in the art, for example, a material made of one or more kinds of resins selected from polyacryls, polyurethanes, polyesters, polyepoxies, polyolefins, polycarbonates, and celluloses. In more detail, the plastic substrate or film is preferably a film having visible-light transmittance of 80% or more such as polyethylene terephthalate (PET), polyvinylbutyral (PVB), polyethylene naphthalate (PEN), polyethersulfon (PES), polycarbonate (PC), and acetyl celluloid. A thickness of the plastic film is preferably 12.5 to 500 micrometers, more preferably 50 to 450 micrometers, and much more preferably 50 to 250 micrometers. The plastic substrate may be a substrate having a structure in which various functional layers such as a gas barrier layer for blocking moisture and gas, and a hard coat layer for reinforcing strength, improving transmittance, and decreasing a haze value are laminated on one side or both sides of the plastic film. The functional layers which may be comprised in the plastic substrate are not limited to the aforementioned layers, and various functional layers may be provided.

In the present invention, materials of the first conductive pattern portion and the second conductive pattern portion may use metals having excellent electric conductivity. Further, a specific resistance value of the conductive pattern material is preferably 1 microOhm cm to 100 microOhm cm, and more preferably 1 microOhm cm to 5 microOhm cm. A detailed example of the conductive pattern material may comprise one or more kinds selected from a group consisting of metal, metal oxide, metal nitride, metal oxynitride, and a metal alloy. In more detail, the conductive pattern material may comprise one or more kinds selected from a group consisting of Ag, Cu, Cr, Al, Mo, Ni, oxide thereof, nitride thereof, oxynitride thereof, and an alloy thereof. The conductive pattern material may be converted and used into a particle form in the case of directly printing, and in this case, the particle form may be particles having a single composition or a mixed composition of the metals enumerated above.

In the present invention, in the case of using ink or a paste comprising the conductive pattern material, the ink or the paste may further comprise an organic binder in addition to the aforementioned conductive pattern material in order to facilitate the printing process. The organic binder may have volatility during a firing process. The organic binder may comprise a polyacrylic resin, a polyurethane resin, a polyester resin, a polyolefin resin, a polycarbonate resin, a cellulose resin, a polyimide resin, a polyethylene naphthalate resin, a modified epoxy, and the like, but is not just limited thereto.

The touch panel may be connected to a power source, and in this case, a resistance value per unit area considering an aperture ratio is 0.01 ohm/square to 1,000 ohm/square and preferably 5 ohm/square to 150 ohm/square at room temperature.

In the present invention, the conductive pattern corresponding to the screen part and the conductive pattern corresponding to the router part are formed by one process and thus the conductive patterns having the same line height and having no connecting portion may be formed on one transparent substrate. As a result, the touch panel may be provided at low costs by a simple process.

Particularly, since shapes and scales of the patterns of the screen part and the router part are generally different from each other, in the related art, the screen part and the router part were formed by different separate processes. Accordingly, in the related art, a connecting portion is inevitably formed in a portion where the conductive pattern corresponding to the screen part and the conductive pattern corresponding to the router part are connected to each other, and as a result, line heights of the conductive pattern corresponding to the screen part and the conductive pattern corresponding to the router part are different from each other and thus a high step is generated at the connected portion therebetween.

However, in the present invention, the conductive pattern corresponding to the screen part and the conductive pattern corresponding to the router part are formed by one process and thus the conductive patterns having the same line height and having no the connecting portion may be formed on one transparent substrate. Accordingly, the step is not generated at the portion where the conductive pattern corresponding to the screen part and the conductive pattern corresponding to the router part are connected to each other, and even though the step is generated, a value thereof is very low. In the case where the step between the materials of the touch panel is low, a change in a line width of a metallic line according to a viewing angle may be maintained at the same level or less as compared with an initial line width, and simultaneously, when the substrate with the conductive pattern is attached to the touch panel by using an adhesive while configuring the touch panel, there are advantages in that defects caused by filling air and the like due to a step of metals are decreased and a light leakage effect may be prevented.

In the present invention, in any one electrically connected region of the first conductive pattern portion, a flow direction of electricity in the first conductive pattern portion from any one side of the screen part to the other side facing the one side and an angle of the conductive line of the first conductive pattern portion may be different from each other.

Generally, due to different pattern shapes and scales of the screen part and the router part, in the related art, the screen part and the router part were formed by different methods, and thus the connecting portion was inevitably formed at a portion where the patterns are connected to each other. However, in the present invention, since the screen part and the pad part may be formed by using one process, there is no connecting portion and line heights thereof are the same as each other.

Figure 4:
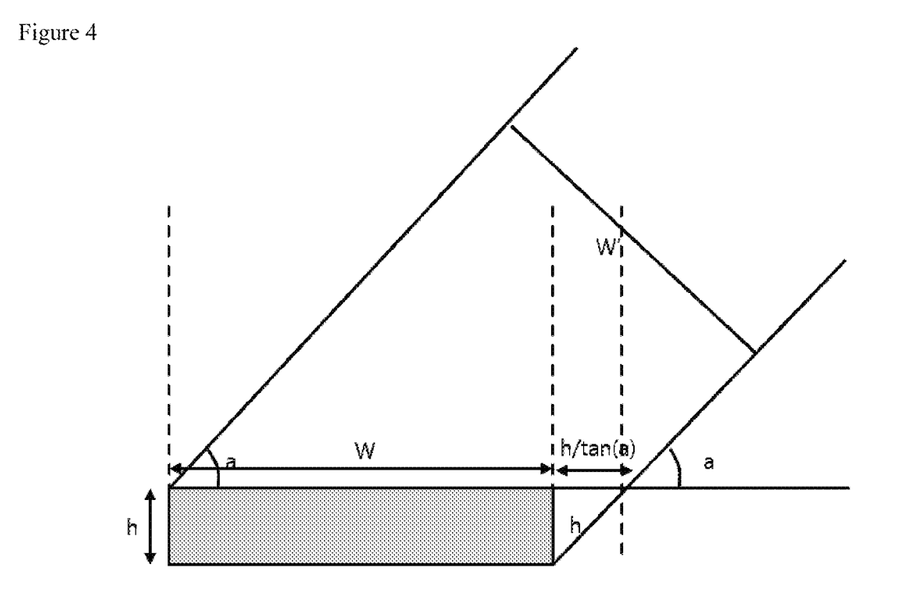
FIG. 4 is a diagram illustrating an aspect ratio of a conductive pattern comprised in a touch panel according to an exemplary embodiment of the present invention.

Hereinafter, FIG. 4 illustrates an aspect ratio of a conductive pattern comprised in a touch panel according to an exemplary embodiment of the present invention.

In FIG. 4, when an initial line width of the conductive pattern is W, a line width of the conductive pattern according to a viewing angle is W', and a line height of the conductive pattern is h, Equation of W'/W+(h/tan(a))=sin(a) is satisfied. As a result, when W' according to an angle satisfies Equation of W'=W sin(a)+h cos(a), a maximum value of W' is W'=($\frac{1}{2}$)$^{1/2}$(W+h). In this case, since it is not preferable that the value exceeds the initial W, it is preferable to satisfy Equation of 0<($\frac{1}{2}$)$^{1/2}$(W+h)<W. Accordingly, the line height h satisfies Equation of h<((2−2$^{1/2}$)/2)W≈<0.293 W. As a result, in the case of a line width of 3 μm, it is preferable that the line height is about 879 nm or less.

Further, at least one of an anti-reflective film, a polarization film, and an anti-fingerprinting film may be provided on at least one side of the touch panel according to the present invention. According to a design specification, different kinds of functional films in addition to the aforementioned functional films may further be comprised. The touch panel may be applied to display apparatuses such as an OLED display panel (ODP), a liquid crystal display (LCD), a cathode-ray tube (CRT), and a PDP.

The invention claimed is:

1. A touch panel, comprising:
a screen part comprising a first conductive pattern portion; and
a router part comprising a second conductive pattern portion,
wherein the first conductive pattern portion and the second conductive pattern portion have the same line height, and there is no connecting portion in a region where the first conductive pattern portion and the second conductive pattern portion are connected with each other, and
wherein the first conductive pattern portion and the second conductive pattern portion comprise a metallic pattern made of the same material, and
wherein a linear resistance value on the shortest distance from any one side contacting the second conductive pattern portion to the other side facing the one side in any one electrically connected region of the first conductive pattern portion is equal to or larger than a linear resistance value from any one side contacting the first conductive pattern portion to the other side where the second conductive pattern portion contacts a terminal part of the router part, in any one electrically connected region of the second conductive pattern portion.

2. The touch panel of claim 1, wherein in any one electrically connected region of the first conductive pattern portion, a flow direction of electricity in the first conductive pattern portion from any one side of the screen part to the other side facing the one side and an angle of the conductive line of the first conductive pattern portion are different from each other.

3. The touch panel of claim 1, wherein at least a part of the second conductive pattern portion has a line width different from that of the first conductive pattern portion.

4. The touch panel of claim 3, wherein a difference in a line width between at least a part of the second conductive pattern portion and the first conductive pattern portion is 5 micrometers or more.

5. The touch panel of claim 3, wherein a difference in a line width between at least a part of the second conductive pattern portion and the first conductive pattern portion is 15 micrometers or more.

6. The touch panel of claim 3, wherein a difference in a line width between at least a part of the second conductive pattern portion and the first conductive pattern portion is 30 micrometers or more.

7. The touch panel of claim 3, wherein a difference in a line width between at least a part of the second conductive pattern portion and the first conductive pattern portion is 100 micrometers or less.

8. The touch panel of claim 1, wherein the first conductive pattern portion and the second conductive pattern portion are formed by one printing process.

9. The touch panel of claim 8, wherein the printing process is a reverse offset printing process.

10. The touch panel of claim 1, wherein the first conductive pattern portion and the second conductive pattern portion comprise the same laminated structure, and the first conductive pattern portion and the second conductive pattern portion contain the same material.

11. The touch panel of claim 1, wherein the metallic pattern contains one or more metals selected from a group consisting of Ag, Cu, Cr, Al, Mo, Ni, and an alloy thereof.

12. A display apparatus comprising the touch panel of claim 1.

13. The touch panel of claim 1, wherein the first conductive pattern portion and the second conductive pattern portion are blackened.

14. The touch panel of claim 1, further comprising a blackening layer on the first conductive pattern portion and the second conductive pattern portion.

* * * * *